ANALOG TO DIGITAL CONVERTER

Filed June 17, 1957 2 Sheets-Sheet 1

INVENTOR.
ALBERT WOLINSKY

BY H. L. Mackey

ATTORNEY.

INVENTOR.
ALBERT WOLINSKY

BY [signature]

ATTORNEY.

United States Patent Office 3,003,142

Patented Oct. 3, 1961

3,003,142

ANALOG TO DIGITAL CONVERTER

Albert Wolinsky, New Rochelle, N.Y., assignor to General Precision, Inc., a corporation of Delaware Filed June 17, 1957, Ser. No. 666,153
10 Claims. (Cl. 340—347)

This invention relates to binary digital computers and more specifically to devices for converting analog signals to binary digital signals suitable for application to such computers.

More particularly the invention relates to an arrangement wherein a code wheel or other mechanically displaceable device is moved in accordance with an analog signal input, while sensing devices in contact therewith provide signals which are in turn operated on by suitable logic circuits to produce unambiguous parallel readout signals.

The converter of this invention operates on the principle of, first, sensing the direction of motion of the code wheel, second, emitting a pulse to signalize an instant when the single sensing device in the least significant digit place of the code wheel is traversing a critical line, third, selecting at this instant the proper one of each pair of sensing devices in each other digit place on the code wheel and, fourth, simultaneously reading out the signals reported from all code wheel digit places by the selected sensing devices to produce from these signals a binary digital numeral. This numeral has no ambiguity in any digit excepting in the least significant digit and thus represents with minimum uncertainty the analog input quantity. This uncertainty is minimum because it is inherent in digital systems and cannot be eliminated.

The basic advantage of the converter of the invention resides in its elimination of all ambiguity of readout as respects all digit positions except the least significant digit. This invention thus eliminates the principal objection to the use of the natural binary digital number system, and obviates the necessity of performing the conversion in the inverted or cyclic code, followed by translation into the natural code.

Another advantage of the converter of this invention is that it uses logic circuits emitting output pulse signals and in general employs means of the binary digital computer art, so that it is readily associated with such computers.

One purpose of this invention is to provide an analog to digital converter having no ambiguity at any time in any output digit above the least significant digit.

Another purpose is to provide such a converter employing logic circuits and procedures.

A further understanding of this invention may be secured from the detailed description and associated drawings, in which.

Figure 1:
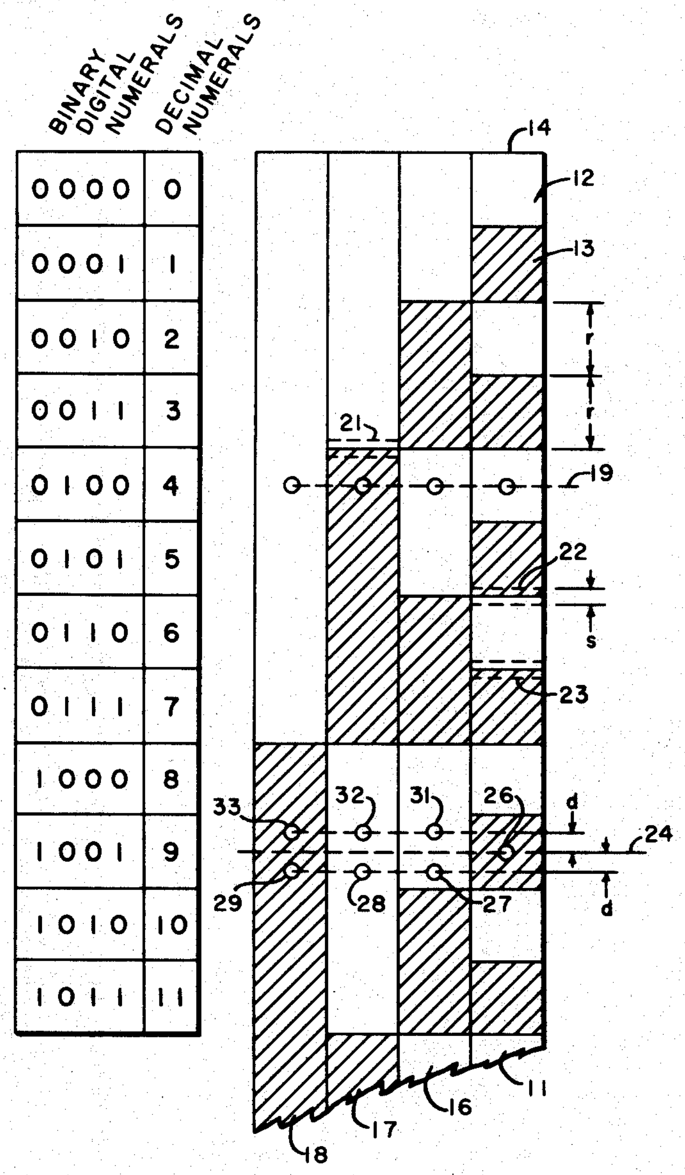
FIGURE 1 is a graphic representation of the natural binary code used in carrying out the objects of the invention.

Referring now to FIG. 1, one form of graphic representation of the natural binary code of numerals is shown as a code translator consisting of several vertical columns, each containing equal rectangles alternately clear and cross-hatched. Although this drawing represents only four columns, the representation has as many columns as there are binary digit places to be represented. The right or first column 11 contains clear areas in the form of rectangles such as rectangle 12 and cross-hatched rectangles such as rectangle 13 of equal lengths *r*. The depicted graphic code starts at line 14, and the values of the numbers which it represents are shown in decimal and binary digital numerals at the left. The second column or zone 16 contains rectangles of double length 2*r*, starting with a clear rectangle and alternating clear and cross-hatched rectangles. Similarly the third column or zone 17 contains rectangles of length 4*r*, the fourth column or zone 18 has lengths 8*r*, and in general in each succeeding zone the rectangle length is doubled. In all zones a clear rectangle represents zero (0) in the binary code and a cross-hatched rectangle represents unity (1).

Numerous forms of code devices have been constructed embodying this garphic representation. For example, a commutator disc is in general use embodying each of the zones of FIG. 1 as a concentric commutating ring, the clear rectangles being represented by insulating sectors and the cross-hatched rectangles being represented by conducting sectors. Of course it is understood by those skilled in the art that numerous other code devices may be used with equal facility.

Associated with the code device, in whatever form it may be, is a plurality of sensing devices, the simplest being an electrical brush bearing on each commutating zone composed of alternate insulating and conducting rectangles.

The pickup devices may be arranged in various ways, the simplest being arrangement in a single transverse line of pickup devices, one in the longitudinal center line of each zone, as depicted by the four small circles on the line 19. Use of this arrangement leads to an ambiguous output, however, as two or more of the pickups may lie on a transition simultaneously. A transition within a zone is defined as the transverse line separating an insulating rectangle from a conducting rectangle. A pickup may give an ambiguous output whenever its sensing area overlays a transition. Therefore in any zone an ambiguous region is that region, equal in length in the longitudinal zone direction to the effective span of a sensing device, which is bisected by a transition. Such a region 21, 22, or 23, has the length *s*.

In order to eliminate ambiguity, the instant invention employs a pair of sensing devices in each higher zone and a single sensing device in the least significant zone.

One arrangement of sensing devices which may be employed in this invention is shown by the seven brushes indicated by the small circles 26–33 arranged along and near the transverse line 24. The least significant zone brush 26 is positioned on this line 24 and the other six brushes are arranged in two parallel lines on opposite sides of the line 24 and equidistant therefrom. These seven brushes are secured together as a mechanical unit, and relative movement, vertical in FIG. 1, may occur between the brushes and the graphic representation device.

Many alternative brush arrangements are permitted in this invention. In general, the lines of brushes need not be equidistant and, indeed, the brushes need not be arranged in straight lines. In fact, the only limitations imposed on brush arrangements are those set by the equation below.

If the longitudinal span in any selected zone of one insulating and one conducting rectangle be termed a unit distance, it is obvious that, if any one or more of the seven brushes arranged about line 24 be displaced along its zone by exactly one unit distance, operation will be exactly the same as before. The same statement is true if the brush be moved any integral number of unit distances.

The range of values which the distance *d* of a brush from line 24 can have is defined by the following inequality. The position of line 24 is defined by the first zone brush 26. In the higher zone under consideration the unit distance is $u$, and the integral number of unit distances which the brush is moved is termed $n$. Then $$(n-1)u+s<d<nu-s$$

It will be noted that, since each commutator zone with its single brush or pair of brushes constitutes a unit, any commutator zone may be slipped up or down relative to the least significant zone, providing that its sensing device or devices are moved in the same way by the same amount, without affecting the theory of operation of this device. It will also be noted that these descriptions and definitions, as well as those to come, apply not only to the three right-hand zones of a commutator but can apply to any three adjacent zones, in which the least significant zone is characterized as the so-named zone herein.

In a dynamic analysis of the code representation of FIG. 1 let it be assumed that the design is wrapped around a cylinder and that the cross-hatched rectangles represent electrically conductive commutator segments and the clear rectangles represent insulating commutator segments. Also assume that the sensing devices disposed at line 24 are employed and that they consist of electrical commutator brushes. If the commutator moves upward relative to the brushes, or the brushes move downward relative to the commutator, the value of the number sensed at line 24 increases. This direction of relative rotation of the commutator is termed forward or positive rotation. Motion in the opposite direction is termed backward or negative rotation.

Those brushes which in forward rotation are in advance or sense higher values are termed the advance or forward brushes and in the figure consist of brushes 27, 28, and 29. The definition, of course, does not apply to the least significant zone but only to all of the other or higher zones. Those brushes which in forward rotation are in the rear or sense lower values are termed the rear or aft brushes. They are brushes 31, 32, and 33.

When the commutator rotates in either direction, whenever line 24 in FIG. 1 passes the upper edge of a conductive rectangle in the least significant zone, then line 24 never simultaneously passes either edge of any rectangle of any other zone. These upper edges are termed non-critical transitions. When, however, the line 24 passes the lower edge of a least significant zone rectangle, it must simultaneously also pass either the lower or the upper edge of a conductive rectangle in the next higher zone, and may or may not also coincide with edges of conductive rectangles in higher zones. The lower edges of conductive rectangles in the least significant zone are therefore termed critical transitions.

Defining critical transitions in another way, in forward rotation a one-zero transition in the least significant zone is critical, but in backward rotation a zero-one transition is of the critical type.

Considering only the zone next to the least significant zone, let the transverse line through the center of a rectangle be termed the axis of symmetry, and let the transverse line coinciding with an end of a rectangle be termed an end line. Then forward and backward rotations may be defined in terms of coincidence in accordance with the following table.

*Direction of rotation*

| Least significant | Next higher zone transverse line | |
|---|---|---|
| Zone transition | Axis of symmetry | End line |
| Zero-one | Forward | Backward. |
| One-zero | Backward | Forward. |

That is to say, if a one-zero transition coincides in time during rotation with an end line the rotation is forward, and if a zero-one transition coincides with an end line the rotation is backward.

Figure 2:
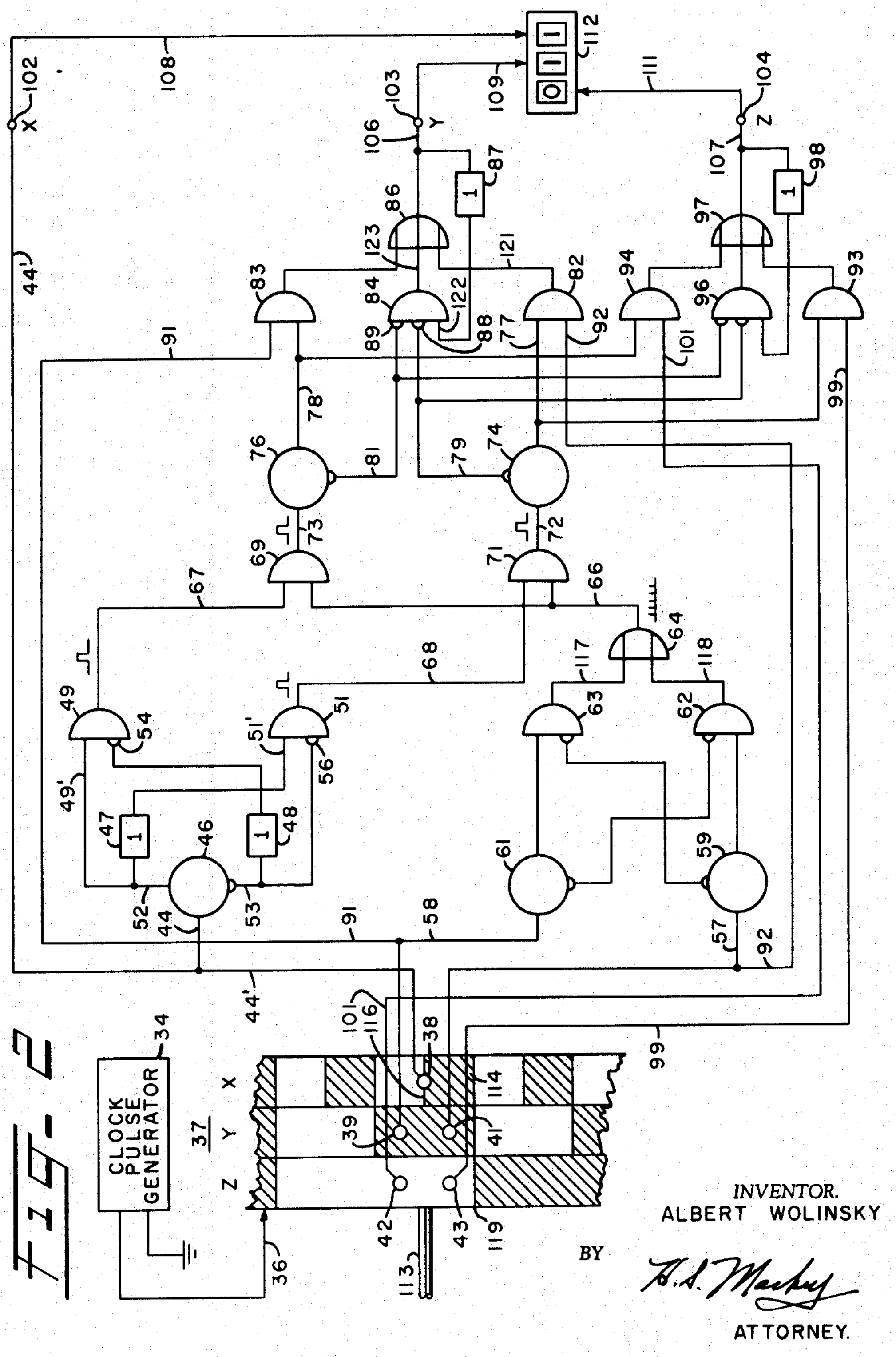
FIGURE 2 is a schematic diagram of an embodiment of the invention.

These statements of structure and dynamic behavior are necessary for the understanding of the instrumentation, which is depicted in FIG. 2. A clock 34 consists of a pulse generator which generates rectangular, symmetrical clock pulses at a rate of one megacycle per second with an excursion, after suitable amplification if necessary, between −10 volts and +30 volts. This pulse train may, however, have any other desired frequency, magnitude, and form suitable for operation of logic circuits. The output of generator 34 is applied through conductor 36 to all of the conductive (cross-hatched) segments of a cylindrical natural binary digital code wheel or drum 37. This wheel 37 is here shown as having but three columns or zones, $x$, $y$, and $z$, for the sake of simplicity. The $x$ zone is the least significant zone and $y$ the next higher zone, etc. The code wheel 37 is provided with five brush pickups, 38, 39, 41, 42, and 43, the single pickup 38 being associated with the least significant zone $x$, pickups 39 and 41 with zone $y$, and 42 and 43 with zone $z$. Brushes 41 and 43 are in the advance brush row and brushes 39 and 42 are in the rear brush row. Motion of the commutator 37 upward in FIG. 2 past the five brushes is termed the forward sense or direction of motion.

The least significant zone single brush 38 is connected through conductor 44 to a logic circuit including five logic components, 46, 47, 48, 49, and 51. This group comprises a subcircuit having for its function the signalling of the time when brush 38 passes a transition and identifying the brush action as entering or leaving a conductive area. This circuit is termed the transition circuit.

The transition circuit includes an inverting component 46 which receives the brush signal and emits a similar signal on conductor 52 and the same signal but inverted on conductor 53. One form of component 46 comprises an amplifying tube followed by a pulse transformer having two pulse outputs of instantaneously opposite sense, polarity, or sign. Components 47 and 48 are one-microsecond delay circuits which may be short artificial transmission lines. Components 49 and 51 are "inhibit and" circuits, the inhibiting inputs being applied to input terminals 54 and 56.

The advance $y$ zone brush 41 and rear brush 39 are connected through conductors 57 and 58 to a logic circuit including five logic components, 59, 61, 62, 63, and 64. This group comprises a subcircuit having for its function the emission of a signal when the brushes 39 and 41 straddle a transition in their zone. This is termed the straddle circuit.

The straddle circuit includes two inverting components 59 and 61 which receive signals from conductors 57 and 58 and transmit signals to "inhibit and" circuits 62 and 63. The outputs of circuits 62 and 63 are applied to a logical "or" circuit 64 having output conductor 66.

The outputs of the transition and straddle subcircuits are applied through conductors 66, 67, and 68 to two "and" components 69 and 71, and with these components compose a sense-of-motion detection and signalling circuit. This circuit functions to emit a single pulse on output conductor 72 during the time period of a critical transition signalizing a forward direction of motion of the commutator 37, or alternatively emits a single pulse on output conductor 73 during the time period of a critical transition signalizing a backward direction of motion of the commutator 37.

The conductors 72 and 73 are connected to apply their signals as inputs to a subcircuit comprising the two inverting components 74 and 76 constituting an inverting subcircuit emitting both replica signals and inverted signals on conductors 77, 78, 79, and 81.

These four conductors are connected to a subcircuit comprising the five logic components 82, 83, 84, 86, and 87. This is a selecting circuit which selects that one of the pair of brushes 39 and 41 in the $y$ commutator zone which at any instant emits a signal representing the current two's place digit. Components 82 and 83 are "and" circuits, component 84 is an "inhibit and" circuit having two inhibiting inputs 88 and 89, component 86 is an "or" circuit, and component 87 is a one-microsecond delay circuit. Additional input connections are brought from brush 39 through conductor 91 to "and" circuit 83, and from brush 41 through conductor 92 to "and" circuit 82.

An identical selecting circuit for zone consists of "and" components 93 and 94, an "inhibit and" circuit 96, an "or" circuit 97, and a delay line 98. To this selecting circuit are brought signals from brush 43 through conductor 99 to "and" circuit 93, and from brush 42 through conductor 101 to "and" circuit 94. The other inputs are taken from input conductors 77, 78, 79, and 81 in parallel with the "y" selecting circuit.

In general, for every pair of higher zone brushes in a code conversion device of any number of zones there is required a selecting circuit identical with these selecting circuits and similarly connected.

The output terminals of the analog to digital converter of this invention are terminals 102, 103, and 104, and in general there is one such terminal for each code wheel zone. The least significant zone terminal 102 is directly connected through conductor 44′ to the single brush 38 of that zone. The higher zone terminals 103 and 104 are connected to the outputs of their respective selecting circuits, terminal 103 being connected through conductor 106 to the output of "or" circuit 86, and terminal 104 being connected through conductor 107 to the output of "or" circuit 97.

The terminals 102, 103, and 104 bear the output signals of this converter constituting unambiguous binary digital number signals. These signals may be applied to a computer, a display register, or may be otherwise utilized. As an example these terminals are shown in the figure connected through conductors 108, 109, and 111 to a display register 112 which, however, does not form part of the combination of this invention.

The three brushes 38, 39, and 41 have dual functions, being connected through conductors 44, 57, and 58 to the sense-of-motion circuit and additionally through conductors 91 and 92 to the $y$ zone selecting circuit and through conductor 44′ directly to the $x$ output terminal. As a first function, these brushes play a part in distinguishing forward from backward rotation, and as a second function, they read out the binary code signal like the other brushes. It is not necessary to restrict the first function to the use of these brushes; any three brushes, two in any zone and one in the next, less significant, zone, may be employed. Any brushes employed for this motion-sensing function may or may not be the same brushes that are employed for the second, readout, function, as desired.

In the operation of this analog to digital converter, a one mc. p.s. train of pulses is continually applied from the pulse generator 34 to the conducting areas of commutator 37. This commutator may be stationary or be rotated relatively slowly by its shaft 113, the angular position of which at any instant constitutes the analog input quantity. Let it be assumed that the commutator is rotating forward slowly, so that its brush 38 has just made contact with the conducting segment 114 and is now in the position shown with its center on transition 116. Let it be assumed that at that instant, although the brush is in an ambiguous area, it is in conductive contact with the area 114. This brush then transmits the one mc. p.s. pulse train to the inverter 46, which emits a replica signal at conductor 52 and simultaneously an inverted signal at conductor 53.

These signals are applied to the "inhibit and" circuits 49 and 51. If a signal be applied to input 49′, and no inhibit signal is applied at input 54, the signal at input 49′ will appear at the output conductor 67. However, if an inhibit pulse signal is applied simutaneously to input 54, no output will appear. Circuit 51 operates similarly.

When, therefore, a pulse train at conductor 52 is continuously applied to input 49′, and an inverted train from conductor 53, delayed one cycle at delay line 48 and, therefore, in phase, is applied to inhibit input 54, the latter train inhibits the circuit and no output appears.

Similarly, when replica signals from conductor 52, delayed one cycle in circuit 47, are continuously applied to input 51′ of circuit 51, and simultaneously inverted undelayed signals are continuously applied from conductor 53 to the inhibit input 56, no output occurs at conductor 68. Of course, when brush 38 is on an insulating segment, the transition circuit emits no signal since it receives none.

However, at the instant that brush 38 makes contact and passes the first pulse through component 46 to the "inhibit and" circuit 49, there is no preceding pulse applied to inhibit input 54, circuit 49 is not inhibited, and a single pulse is emitted at conductor 67. The occurrence of this pulse on conductor 67 therefore indicates that the brush 38 is entering a conductive area. When the brush 38 leaves a conductive area, the last pulse is delayed one $\mu s$, in delay unit 47 and, when it is applied therefrom to the "inhibit and" circuit 51, there is no inhibiting pulse at terminal 56. Therefore, this circuit emits a pulse at conductor 68. The presence of this pulse indicates that the brush 38 is leaving a conductive area.

To recapitulate, the transition circuit emits a single pulse on conductor 67 only when brush 38 first touches a conducting segment, and emits a single pulse on conductor 68 only when brush 38 leaves a conducting segment.

The straddle circuit comprising components 59, 61, 62, 63, and 64 secures signals from the $y$ zone brushes 41 and 39, one in advance and the other in the rear. When both brushes are on a conductive segment, signal trains are applied through conductors 57 and 58 and inverting circuits 59 and 61 to "inhibit and" circuits 62 and 63. Both of these latter circuits are inhibited, however, and no signals are emitted. When both brushes 39 and 41 are on an insulating segment, of course, no signals are applied to the straddle circuit and none are emitted. When, however, either brush 39 or brush 41 is on a conducting segment while the other is on an insulating segment, and they thus straddle a transition, one of the "inhibit and" circuits passes a signal while the other is not energized. Thus if brush 39 be on a conducting segment while brush 41 is not, "inhibit and" circuit 63 emits a signal, applying it through conductor 117 to "or" circuit 64. Similarly, when only brush 41 is on a conductive segment, a signal is applied through circuit 62 and conductor 118 to "or" circuit 64. In either case the "or" circuit 64 emits a signal, so that a pulse generator signal train exists in conductor 66 whenever either one, but not both, of the brushes 39 and 41 is in contact with a conductive segment.

The operation of the direction of motion sensing circuit is as follows. Let it be supposed that the rotation is forward. Conductor 68 then carries a single pulse each time that brush 38 passes a critical transition, which is in line with a transverse end line of a conductive section in the $y$ zone. At this instant brushes 39 and 41 straddle this end line and, therefore conductor 66 carries a pulse train. Both this pulse train and the single pulse in conductor 68 are applied to "and" component 71, with the result that a single coincident pulse is emitted at conductor 72.

If, however, rotation is backward the single pulse from the transition circuit during the critical transition time is on conductor 67. This pulse, being applied to "and" circuit 69 together with the pulse train in conductor 66, since brushes 39 and 41 are straddling a transition, causes a single pulse in conductor 73.

To recapitulate, a single pulse in conductor 72 indicates forward rotation and a single pulse in conductor 73 indicates backward rotation. These pulses always occurs at the times of $x$ zone critical transitions and at no other times.

Conductors 72 and 73 being connected to inverting circuits 74 and 76, the two outputs 77 and 78 carry replicas of these pulses and the two outputs 79 and 81 carry inverted pulses.

The $y$ selecting circuit comprising components 82, 83, 84, 86, and 87 has the functions of selecting either brush 39 or brush 41 at each critical transition instant, of emitting a signal representative of that brush take-off signal, and of perpetuating it until the next critical transition instant. The selecting circuit output signal consists of either the presence or absence of a continuous pulse train.

Assume forward rotation. At a critical transition instant a replica pulse is applied from inverter 74 to "and" circuit 82. Also assume that the median brush line is at end line 119 of the commutator. Brush 41 is, therefore, on an insulating segment and no signal is applied through conductor 92 to "and" circuit 82 which therefore cannot emit a signal. No signal is therefore applied to any of the three inputs of "or" circuit 86 and no pulse train signal is emitted. This constitutes a zero signal in conductor 109 to the middle place of register 112.

On the other hand, still assuming forward rotation, also assume that the advance brush 41 is on a conductive segment at the critical transition instant. This is the position which is about to be assumed by the brushes 27 and 31, FIG. 1, in forward rotation. A pulse train is then applied to "and" circuit 82, FIG. 2, from conductor 92 at the time that a single pulse is applied thereto from conductor 77. A single pulse is, therefore, emitted on conductor 121 and applied to "or" circuit 86. This results in a single output pulse in output conductor 106. This pulse is delayed in circuit 87 by one pulse period and applied to input 122 of "inhibit and" circuit 84. Since there is no pulse in the inverting circuit 76 none is applied to the inhibiting input 89, and since the time is one period later than the passage of the single pulse through inverting circuit 74, none is applied to the inhibiting input 88. Therefore, an output pulse appears at conductor 123, passes through "or" circuit 86, and appears on output conductor 106. This action is repeated continuously at the feedback frequency. Thus the single initiating pulse becomes a pulse train through the regenerative action of elements 86, 87, and 84. At the next critical transition instant this train is broken by the appearance of an inhibiting pulse on conductor 79.

A similar analysis involving brush 39 and elements 76 and 83 reveals that similar action occurs when the rotation is backward.

A similar analysis involving the $z$ zone brushes 42 and 43 and the $z$ selecting circuit is identical with the above analysis. The $z$ selecting circuit selects the proper brush signal and applies it through conductor 111 to the second from the least significant digit place of the register 112. When the commutator contains more than three zones, as it generally does, an additional selecting circuit identical with the one described is provided for each additional commutator zone brush pair, and each selecting circuit operates in a manner similar to the described operation of the $y$ zone selecting circuit.

Heretofore it has been assumed that the device of this invention operates with the code translation cylinder or other device in motion, however slow this motion may be. This assumption is indeed necessary in describing the sense-of-motion component comprising the transition and straddle circuits. This component functions only when the code translator cylinder is in motion. However, the feedback feature of the selecting circuit by which a continuous output train of pulses may be emitted converts the analog-to-digital converter into a device which operates continuously, including periods when the code translator is stationary. In all such cases, when the code translator stops, the existing output signals from the several selecting circuits continue, being in each case either the presence or the absence of a continuing train of pulses. These signals continue until such time as the code translator is again put in motion, which may be either forward or backward, and the next least-significant zone critical transition is crossed, at which instant all signal trains are terminated and a new set of trains is initiated.

What is claimed is:

1. An analog to digital converter comprising, a code translator bearing binary digital code indicia thereon in alternate binary representations and in a plurality of zones of increasing digital significance, a single readout device associated with one of said zones producing signals representative of one or the other of the binary digits in accordance with the particular indicia of the zone read out thereby, a pair of readout devices associated with each of a plurality of zones of significance higher than that of the least significant zone, each of which produces signals representative of one or the other of the binary digits in accordance with the particular indicia of the zone read out by the individual ones of said pair of readout devices, means for providing relative motion between said code translator and said readout devices, each of said pairs of readout devices being positioned to read out different binary values when said single readout device is located at a position of changing binary value, means operated by a signal produced by said single readout device and by the relative values of the signals produced by a selected pair of readout devices for producing a pair of direction indication signals one of which is indicative of relative motion between said code translator and readout devices in one direction and the other of which is indicative of such motion in the opposite direction, and means operated by said direction indication signals for applying to a register a signal whose value is dependent on the binary digit value of the signal read out by a selected one of said pair of readout devices.

2. An analog to digital converter comprising, a code translator bearing binary digital code indicia thereon in a plurality of zones of increasing digital significance, each zone being composed of alternate sectors representative of binary digital values, a single readout device associated with the least significant zone of said code translator and producing signals representative of one or the other binary digit in accordance with the particular sector read out thereby, a pair of readout devices associated with each of a plurality of zones of higher significance, each individual one of said pairs of readout devices producing an individual signal representative of one or the other binary digit in accordance with the particular sector read out by the individual one of said pairs of readout devices, means for providing relative motion between said code translator and said readout devices, each of said pairs of readout devices being positioned to read out different binary values when said single readout device is located at a margin between alternate sectors, means operated by a signal produced by the transition of said single readout device from one sector to the other of its associated zone and by signals produced by a selected pair of readout devices when respectively associated with unlike sectors of their associated zone for producing one or the other of a pair of direction indication signals one of which is indicative of relative motion between said code translator in one direction and the other of which is indicative of such motion in the opposite direction, and means operated by the direction signal for generating a register-actuating signal from the signal sensed by a selected one of a pair of readout devices.

3. An analog to digita converter comprising, a code translator bearing binary digital code indicia thereon in a plurality of zones of increasing digital significance, each zone being composed of alternate sectors representative of alternate binary digital values, a single sensing element positioned adjacent one of said zones for sensing the code indicia of the alternate sectors thereof, a pair of sensing elements positioned adjacent a zone of significance higher than that of the zone sensed by said single sensing element, means for producing relative motion between said code translator and said sensing elements, said pair of sensing elements being positioned to sense sectors of unlike value when said single sensing element is adjacent a margin between sectors, means producing a first transition signal on the transition of said single sensing element from a position adjacent a sector representing one binary digital value to a position adjacent a sector representing the other binary digital value and producing a second transition signal on transition of said single sensing element from a position adjacent a sector representing the other binary digital value to a position adjacent a sector representing the one binary digital value, means producing a critical transition signal when respective ones of said pair of sensing elements are positioned adjacent sectors representing unlike binary digital values, means operated by said first transition signal and said critical transition signal for producing a first direction signal indicative of relative motion between said code translator and said sensing elements in one direction, means operated by said second transition signal and said critical transition signal for producing a second direction signal indicative of relative motion between said code translator and said sensing elements in the opposite direction, a register, means operated by said first direction signal for applying a signal sensed by one of said pair of sensing elements to said register, and means operated by said second direction signal for applying a signal sensed by the other of said pair of sensing elements to said register.

4. An analog to digital converter comprising, a code translator bearing binary digital code indicia thereon in a plurality of zones of increasing digital significance, each zone being composed of alternate sectors representative of alternate binary digital values, a single sensing element positioned adjacent the zone of least significance sensing the code indicia of the alternate sectors thereof, a pair of sensing elements positioned adjacent a zone of significance higher than that of said least significiance zone each sensing the code indicia of the sector adjacent to the respective one of said pair of sensing elements, means for producing relative motion between said code translator and said sensing elements, said pair of sensing elements being positioned to sense sectors of unlike value when said single sensing element is adjacent a margin between sectors, means for producing a first transition signal on the transition of said single sensing element from a position adjacent a sector representing one binary digital value to a position adjacent a sector representing the other binary digital value and producing a second transition signal on the transition of said single sensing element from a position adjacent a sector representing the other binary digital value to a position adjacent a sector representing the one binary digital value, means producing a critical transition signal on the positioning of the respective ones of said pair of sensing elements adjacent sectors representing unlike binary digital values, means operated by said first transition signal and said critical transition signal for producing a first direction signal indicative of relative motion between said code translator and said sensing elements in one direction, means operated by said second transition signal and said critical transition signal for producing a second direction signal indicative of relative motion between said code translator and said sensing elements in the opposite direction, a register, and means operated by one or the other of said direction signals for applying a signal to said register which is representative of the code indicia sensed by that one of said pair of sensing elements which is in advance as respects the direction of relative motion between said code translator and said sensing elements.

5. An analog to digital converter comprising, a code translator bearing binary code indicia thereon in a plurality of zones of increasing digital significance, each zone being composed of alternate sectors representative of alternate binary digital values, a single sensing element positioned adjacent the zone of least significance sensing the code indicia thereof and producing a signal of one value or another value depending on the sector sensed, a pair of sensing elements positioned adjacent a zone of significance higher than that of said least significant zone, each sensing the code indicia thereof and each producing a signal of one value or another value depending on the sector sensed by the individual sensing element of said pair, means for producing relative motion between said code translator and said sensing elements, said pair of sensing elements being positioned to sense sectors of unlike value when said single sensing element is adjacent a margin between sectors, means for producing a first transition signal at the instant the signal produced by said single sensing element changes from said one value to the other value and producing a second transition signal at the instant the signal produced by said single sensing element changes from said other value to said one value, means producing a critical transition signal during intervals in which the signals produced by the individual ones of said pair of sensing elements have unlike values, a first "and" gate having said first transition signal and said critical transition signal impressed thereon and producing therefrom a first direction signal indicative of relative motion between said code translator and sensing elements in one direction, a second "and" gate having said second transition signal and said critical transition signal impressed thereon and producing therefrom a direction signal indicative of relative motion between said code translator and sensing elements in the opposite direction, a register, and means operated by one or the other of said direction signals for applying a signal to said register which is representative of the value of the signal produced by that one of said pair of sensing elements which is in advance as respects the direction of relative motion between said code translator and said sensing elements.

6. An analog to digital converter comprising, a code translator bearing binary code indicia thereon in a plurality of zones of increasing digital significance, each zone being composed of alternate sections representative of alternate binary digital values, a single sensing element positioned adjacent the zone of least significance sensing the code indicia thereof and producing a signal of one value or another value depending on the section sensed, a pair of sensing elements positioned adjacent a zone of significance higher than that of said least significant zone, each sensing the code indicia thereof and each producing a signal of one value or another value depending on the section sensed by the individual sensing element of said pair, means for producing relative motion between said code translator and said sensing elements, said pair of sensing elements being positioned to sense sections of unlike value when said single sensing element is adjacent a margin between sections, means for producing a first transition signal at the instant the signal produced by said single sensing element changes from said one value to the other value and producing a second transition signal at the instant the signal produced by said single sensing element changes from said other value to said one value, means producing a critical transition signal during intervals in which the signals produced by the individual ones of said pair of sensing elements have unlike values, a first "and" gate having said first transition signal and said critical transition signal impressed thereon and producing therefrom a first direction signal indicative of relative motion between said code translator and sensing elements in one direction, a second "and" gate having said second transition signal and said critical transition signal impressed thereon and producing therefrom a direction signal indicative of relative motion between said code translator and sensing elements in the opposite direction, a third "and" gate having impressed thereon one of said direction signals and signals of one value produced by one of said pair of sensing elements and producing an output signal from the concurrence thereof, a fourth "and" gate having impressed thereon the other of said direction signals and signals of one value produced by the other of said pair of sensing elements and producing an output signal from the concurrence thereof, an "or" gate having the outputs of said third and fourth "and" gates impressed thereon, and a register actuating by the output of said "or" gate.

7. A device for sensing and indicating direction of motion comprising, a device whose direction of motion is to be sensed having incorporated thereon at least two zones each composed of alternate sectors representative of different values, the sectors of one of said zones being an even multiple in length in the direction of motion as respects the length of the sectors of the other zone, a first sensing element positioned to sense the values of the alternate sectors of said other zone and to produce a signal of one value or another value depending on the sector being sensed, second and third sensing elements positioned to sense the values of the alternate sectors of said one zone and each producing signals of one value or another value depending on the particular sector sensed by each, said second and third sensing elements being positioned to sense sectors of unlike value when said first sensing element is positioned adjacent a margin between sectors, means for producing a first transition signal at the instant the signal produced by said first sensing element changes from said one value to the other value and producing a second transition signal at the instant the signal produced by said first sensing element changes from said other value to said one value, means for producing a third transition signal during only those intervals in which the signals produced by said second and third sensing elements have unlike values, means operated by said first and third transition signals for producing a signal indicative of motion of said device in one direction, and means operated by said second and third transition signals for producing a signal indicative of motion of said device in the opposite direction.

8. A device for sensing and indicating direction of motion comprising, a device whose direction of motion is to be sensed having incorporated thereon at least two zones each composed of consecutive sections, the sections of one of said zones being an even multiple in length in the direction of motion as respects the length of the sections of the other zone, a clock pulse generator, means for applying a train of clock pulses generated by said clock pulse generator to alternate ones of said consecutive sections in each of said zones, a first sensing element positioned to sense the clock pulses applied to the sections of said other zone, second and third sensing elements positioned to sense the clock pulses applied to the sections of said one zone, said second and third sensing elements being positioned to sense different sections of said one zone when said first sensing element is adjacent a margin between consecutive sections of said other zone, means for producing a first transition signal pulse at the instant said first sensing element senses the initial clock pulse of said train of clock pulses in said alternate sections of said other zone and producing a second transition signal pulse at the instant said first sensing element senses the terminal clock pulse of said train of clock pulses in said alternate section of said other zone, means for producing a train of transition pulses during only those intervals when only one of said second and third sensing elements senses said train of clock pulses, a first "and" gate circuit having said first transition signal pulse and said train of transition pulses impressed on the inputs thereof and producing from the concurrence thereof a first signal indicative of motion of said device in one direction, and a second "and" gate circuit having said second transition pulse and said train of transition pulses impressed on the inputs thereof and producing from the concurrence thereof a second signal indicative of motion of said device in the opposite direction.

9. A device for sensing and indicating direction of motion comprising, a device whose direction of motion is to be sensed having incorporated thereon at least two zones each composed of consecutive sections, the sections of one of said zones being an even multiple in length in the direction of motion as respects the length of the sections of the other zone, a clock pulse generator, means for applying a train of clock pulses generated by said clock pulse generator to alternate ones of said consecutive sections in each of said zones, a first sensing element positioned to sense the clock pulses applied to the sections of said other zones, second and third sensing elements positioned to sense the clock pulses applied to the sections of said one zone, said second and third sensing elements being positioned to sense different sections of said one zone when said first sensing element is adjacent a margin between consecutive sections of said other zone, an inverter having the train of clock pulses sensed by said first sensing element impressed thereon and producing therefrom a first train of pulses corresponding to said clock pulses and a second train of pulses corresponding to the inversion of said clock pulses, a first "inhibit and" gate having a conduct input which produces a signal output and an inhibit input which prevents signal output thereof, said first train of pulses being impressed on said conduct input and said second train of pulses being impressed on said inhibit input through a delay line having a delay of one clock period, a second "inhibit and" gate having a conduct input which produces a signal output and an inhibit input which prevents signal output thereof, said first train of pulses being impressed on the conduct input of said second "inhibit and" gate through a delay line having a delay of one clock period and said second train of pulses being impressed on the inhibit input of said second "inhibit and" circuit, means for producing a train of transition pulses during only those intervals when only one of said second and third sensing elements senses said train of clock pulses, a first "and" gate having the output of said first "inhibit and" gate and said train of transition pulses impressed thereon, and a second "and" gate having the output of said second "inhibit and" gate and said train of transition pulses impressed thereon.

10. A device for sensing and indicating direction of motion comprising a device whose direction of motion is to be sensed having incorporated thereon at least two zones each composed of consecutive sections, the sections of one of said zones being an even multiple in length in the direction of motion as respects the length of the sections of the other zone, a clock pulse generator, means for applying a train of clock pulses generated by said clock pulse generator to every alternate one of said consecutive sections in each of said zones, a first sensing element positioned to sense the clock pulses applied to the sections of said other zone, second and third sensing elements being positioned to sense different sections of said one zone when said first sensing element is adjacent a margin between consecutive sections of said other zone, a first inverter having the train of clock pulses sensed by said first sensing element impressed thereon and producing therefrom a first pulse train corresponding to said clock pulses and a second pulse train corresponding to the inversion of said clock pulses, a first "inhibit and" gate having a conduct input which produces a signal output and an inhibit signal input which prevents signal output thereof, said first train of pulses being impressed on said conduct input and said second train of pulses being impressed on said inhibit input through a delay line having a delay of one clock period, a second "inhibit and" gate having a conduct input which produces a signal output and an inhibit input which prevents signal output thereof, said first train of pulses being impressed on the conduct input of said second "inhibit and" gate through a delay line having a delay of one clock period and said second train of pulses being impressed on the inhibit input of said second "inhibit and" gate, a second inverter having the train of clock pulses sensed by said second sensing element impressed thereon and producing therefrom a third pulse train corresponding to said clock pulses and a fourth pulse train corresponding to the inversion of said clock pulses, a third inverter having the train of clock pulses sensed by said third sensing element impressed thereon and producing therefrom a fifth pulse train corresponding to said clock pulses and a sixth pulse train corresponding to the inversion of said clock pulses, a third "inhibit and" gate having a conduct input which produces a signal output and an inhibit input which prevents signal output thereof, said third "inhibit and" gate having said third pulse train impressed on its conduct input and said sixth signal train impressed on its inhibit input, a fourth "inhibit and" gate having a conduct input which produces a signal output and an inhibit input which prevents signal output thereof, said fourth "inhibit and" gate having said fifth signal train impressed on its conduct input and said fourth signal train impressed on its inhibit input, an "or" gate having the outputs of each of said third and fourth "inhibit and" gates impressed on the inputs thereof, a first "and" gate having the output of said first "inhibit and" gate and the output of said "or" gate impressed thereon, and a second "and" gate having the output of said second "inhibit and" gate and the output of said "or" gate impressed thereon.

References Cited in the file of this patent

UNITED STATES PATENTS

| | | |
|---|---|---|
| 2,656,106 | Stabler | Oct. 20, 1953 |
| 2,747,797 | Beaumont | May 29, 1956 |
| 2,779,539 | Darlington | Jan. 26, 1957 |
| 2,793,807 | Yaeger | May 28, 1957 |
| 2,796,598 | Cartwright | June 18, 1957 |
| 2,814,443 | Mills | Nov. 26, 1957 |
| 2,852,764 | Frothingham | Sept. 16, 1958 |

OTHER REFERENCES

Richards: "Arithmetic Operations in Digital Computers," D. Van Nostrand Co., p. 197, 1955.